United States Patent [19]
Pizzo

[11] 3,811,643
[45] May 21, 1974

[54] ANTI HIJACKING SYSTEM FOR AIRCRAFT

[76] Inventor: Gustano A. Pizzo, 34-20 74th St., Jackson Heights, N.Y. 11372

[22] Filed: Nov. 2, 1972

[21] Appl. No.: 303,094

[52] U.S. Cl............ 244/137 P, 244/1 R, 244/118 P
[51] Int. Cl............................................. B64d 25/08
[58] Field of Search............ 244/137 R, 137 P, 1 R, 244/129 D, 118 R, 118 P, 141; 109/3, 5, 6, 7

[56] References Cited
UNITED STATES PATENTS

| | | | |
|---|---|---|---|
| 2,749,065 | 6/1956 | Soule | 244/141 |
| 3,658,277 | 4/1972 | Anderson | 244/1 R |
| 1,498,798 | 6/1924 | Houle | 109/6 |
| 3,438,601 | 4/1969 | McIntyre | 244/137 P |
| 3,313,250 | 4/1967 | Turano | 109/6 |
| 308,488 | 11/1884 | Grebe | 109/3 |
| 1,635,121 | 7/1927 | Goodman | 109/5 |
| 1,517,136 | 11/1924 | Wagner | 109/3 |

FOREIGN PATENTS OR APPLICATIONS 581,485   9/1924   France............................ 244/141

*Primary Examiner*—Duane A. Reger
*Assistant Examiner*—Galen L. Barefoot

[57] ABSTRACT

An anti hijacking system for an airplane to be operated during flight. A partition or barrier located immediately aft of the pilots cabin is adapted to be raised dividing the aft section longitudinally into port and starboard areas, the floors of which are dropped on command to lower the hijacker into a capsule in the belly of the plane. The capsule is releasable through opened bomb bay doors having attached thereto a parachute for safely returning the hijacker within the capsule to earth.

1 Claim, 2 Drawing Figures

ANTI HIJACKING SYSTEM FOR AIRCRAFT

This invention relates to anti-crime devices and, in particular, to the construction of an aircraft which has as its purpose to foil hijackers by safely removing them from the aircraft in flight.

In general, the airplane is constructed with a fore and aft partition which can be raised into an area aft of the pilots cabin to isolate the hijacker in the area the floor of which is constructed of a pair of pivotal sections which are adapted to be dropped for lowering the hijacker into a releasable capsule to which a parachute is attached. Bomb bay doors are provided in the belly of the plane for ejection of the capsule from the aircraft.

One object of the invention is to provide a unique construction system for an aircraft designed to foil and abort hijacking attempts.

Figure 1:
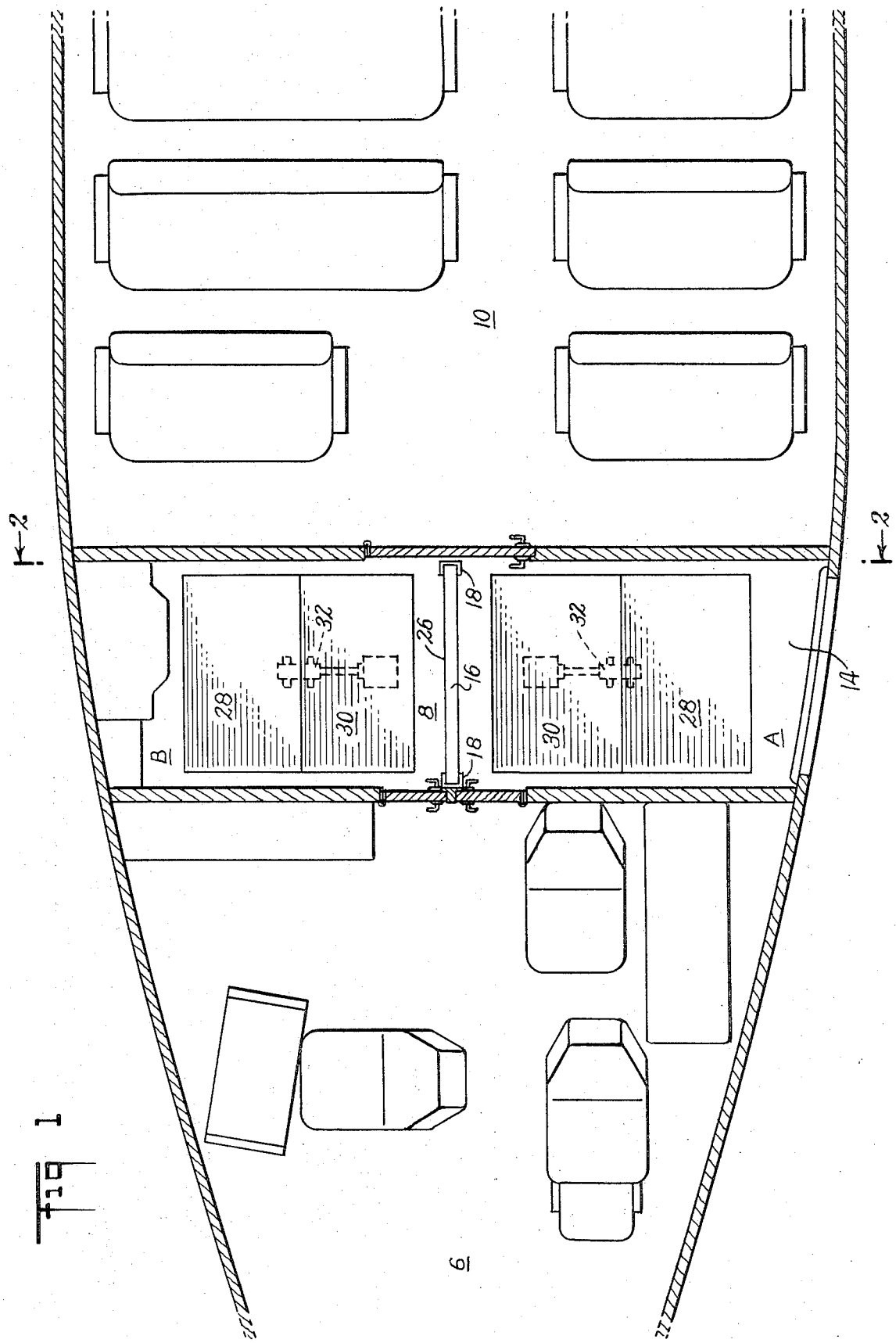
Figure 2:
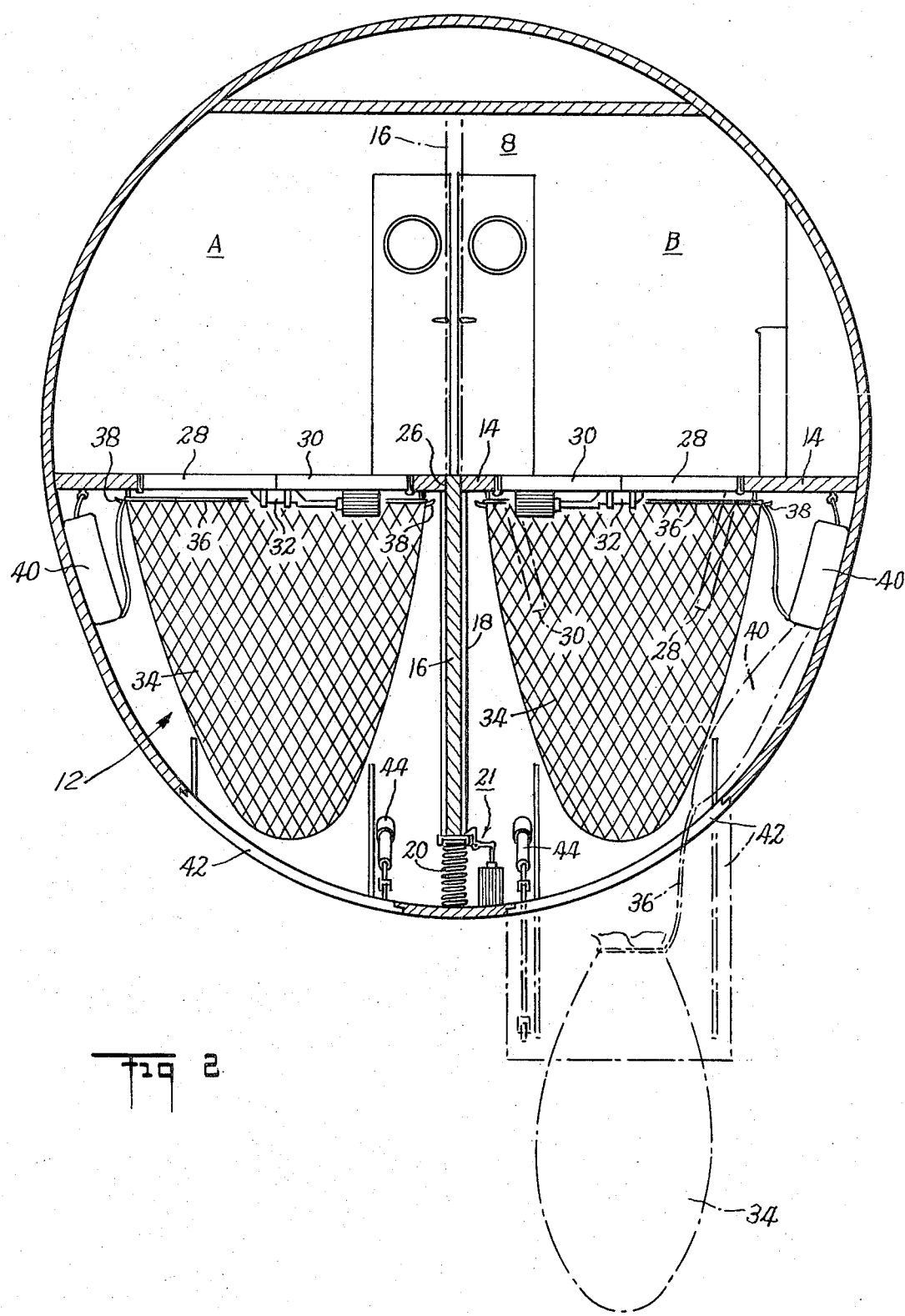

Other objects and advantages of the invention may be appreciated on reading the following description of one embodiment thereof which is taken in conjunction with the accompanying drawings, in which:

FIG. 1 is a horizontal sectional view in plan of the forward end of an aircraft wherein the instant invention is disposed; and FIG. 2 is a transverse section through the aircraft of FIG. 1 and taken on the line 2—2 of FIG 1

Referring to the drawings, there is shown a fusilage of an aircraft which is generally divisible into pilots cabin 6, service area 8, and passenger cabin 10. The interior, underside or belly area 12 of the plane is a hollow region underneath the three areas aforementioned being separated therefrom by deck 14.

Disposed along the longitudinal axis of the plane normally in the belly 12 underneath the service area 8 is a partition barrier 16 slidable in fore and aft track guides 18 being urged upwardly by springs 20 on actuation of solenoid operated arming device 21. The barrier 16 is lowered to its normal position manually or be mechanical means (not shown).

The deck is slotted at 26 to permit the barrier 16 to be raised into the service area 8 and extend substantially to the ceiling of the plane, thus dividing the service area into port and starboard zones A and B. Each zone is provided with a floor comprising pivotal sections 28 and 30, the free edges of the sections normally abutting in the middle of each zone and supported by latch 32 which is solenoid controlled from the pilots cabin by means not shown. The sections 28 and 30 are restored to their normal horizontal position by manual or mechanical means as desired.

Underneath each zone of the service area is a releasable capsule 34 in the form of a net and having a draw cord 36, each being supported in the belly area 12 of the aircraft by releasable hooks 38 projecting below deck 14. The draw cord 36 of each capsule is attached to a parachute 40 which is opened automatically by the weight of the hijacker a he falls into one of the capsules 34 releasing the draw cord 36 free of the hooks 38 and closing the capsule over him by conventional and well known rip cord attachment devies. Simultaneously, the bomb bay doors 42 are opened by air cylinders 44 permitting the capsule 34 and its parachute 40 to drop therethru, as shown by the dot-dash lines in FIG. 2.

In particular, the pilot on being notified on an attempted hijacking, as by a stewardess, raises the partition 16 to isolate the perpetrator in one of the port or starboard zones of the service area. Thus separated from others in the airplane, including the stewardess, he is dropped into one of the top openings of one of the capsules 34, at which point the bomb bay doors 42 are opened and the capsule 34, with its human cargo, is parachuted safely to earth.

Various modifications of the invention may be effected by persons skilled in the art without departing from the scope and principle of the invention as defined in the appended claims.

What is claimed is:

1. An aircraft having a fuselage comprising a belly separated from a pilots cabin, a passengers section and an enclosed area intermediate thereof by a deck, a partition normally disposed in the belly of said aircraft and means for raising said partition into said area for effectively sealing off any person positioned in one of the zones defined by said partition and the fuselage of the aircraft, means for gaining access to the pilot's cabin and the passenger section from either zone when said partition is raised, the deck of each zone comprising hinged sections adapted to pivot from edge abutting position to a position directed to the belly of the aircraft, means for operating said hinged sections, a capsule separate from the aircraft fuselage disposed under each zone, a bomb-bay door under each zone with a capsule supported over each door, means for controlling each door for selectively jettisoning one of said capsules from the aircraft, a parachute being attached to each capsule and means being provided for automatically opening the chutes when a capsule is released through one of said doors.

* * * * *